US010302743B2

(12) United States Patent
Huard et al.

(10) Patent No.: US 10,302,743 B2
(45) Date of Patent: May 28, 2019

(54) SYSTEMS AND METHODS FOR ANTENNA ANALYSIS AND VALIDATION

(71) Applicant: Raytheon Company, Waltham, MA (US)

(72) Inventors: Andrew Huard, Santa Paula, CA (US); Amedeo Larussi, Oxnard, CA (US); Kim Mcinturff, Santa Barbara, CA (US)

(73) Assignee: Raytheon Company, Waltham, MA (US)

(*) Notice: Subject to any disclaimer, the term of this patent is extended or adjusted under 35 U.S.C. 154(b) by 667 days.

(21) Appl. No.: 14/734,844

(22) Filed: Jun. 9, 2015

(65) Prior Publication Data
US 2018/0113194 A1 Apr. 26, 2018

(51) Int. Cl.
*G01S 3/02* (2006.01)
*G01S 3/14* (2006.01)
(Continued)

(52) U.S. Cl.
CPC ............ *G01S 7/4004* (2013.01); *G01S 3/023* (2013.01); *G01S 3/14* (2013.01); *G01S 7/021* (2013.01); *G06N 20/00* (2019.01)

(58) Field of Classification Search
CPC .... G01S 3/02–3/026; G01S 3/06; G01S 3/16; G01S 3/28; G01S 3/46; G01S 2013/468;
(Continued)

(56) References Cited

U.S. PATENT DOCUMENTS 4,929,958 A * 5/1990 Hodel .................. G01S 3/28
342/432
5,343,212 A * 8/1994 Rose .................. G01S 11/04
342/424
(Continued)

OTHER PUBLICATIONS

Gregoire ("Advanced ESM AOA and Location Techniques", International Business Machines Corporation, 1989).*
(Continued)

*Primary Examiner* — Peter M Bythrow
*Assistant Examiner* — Nuzhat Pervin
(74) *Attorney, Agent, or Firm* — Burns & Levinson, LLP; Joseph M. Maraia

(57) ABSTRACT

Systems and methods are disclosed herein which facilitate generating and utilizing look-up tables for determining an AoA of a radar signal received from an emitter. In example embodiments, the systems and methods may involve a selectivity process for selecting, for each of a plurality of installation positions, an installation-representative antenna pattern as selected from an option set. Thus, the selectivity process may, for example, include indexing a plurality of data sets of antenna patterns associated with an antenna position and selecting a most representative data set from at least one of the indexed data sets. In some embodiments, the system and methods may further apply a compression algorithm which identifies changes in slope with respect to adjacent pairs of antenna positions (vertex pairs) in the look-up table. The algorithm may then discard any antenna position (any vertex) that does not meet a slope difference threshold with respect to changes in the slope.

18 Claims, 21 Drawing Sheets

(51) Int. Cl.
*G01S 7/02* (2006.01)
*G01S 7/40* (2006.01)
*G06N 20/00* (2019.01)

(58) Field of Classification Search
CPC ....... G01S 13/87; G01S 13/878; H01Q 21/29; H01Q 25/00
USPC .......................................................... 342/173
See application file for complete search history.

(56) References Cited

U.S. PATENT DOCUMENTS

| | | | | |
|---|---|---|---|---|
| 5,541,608 A * | 7/1996 | Murphy | .................. | G01S 3/023 342/174 |
| 6,147,646 A * | 11/2000 | Arneson | .................... | G01S 3/28 342/13 |
| 6,377,214 B1 * | 4/2002 | Melville, II | .............. | G01S 3/48 342/156 |
| 6,411,249 B1 * | 6/2002 | Rose | ........................ | G01S 7/021 342/13 |
| 6,700,536 B1 * | 3/2004 | Wiegand | ................. | G01S 3/023 342/417 |
| 7,268,728 B1 * | 9/2007 | Struckman | ................ | G01S 5/04 342/424 |
| 7,327,303 B1 * | 2/2008 | Halsey | .................... | G01S 7/021 342/13 |
| 7,358,891 B2 * | 4/2008 | Struckman | .............. | G01S 3/146 342/148 |
| 7,642,963 B2 * | 1/2010 | Apostolos | ................. | G01S 5/04 342/375 |
| 7,667,572 B2 * | 2/2010 | Husak | .................. | G06K 7/0008 340/10.1 |
| 7,710,343 B2 * | 5/2010 | Chiu | ........................ | H01Q 1/38 343/795 |
| 8,244,772 B2 * | 8/2012 | Aasman | .................. | G06F 16/28 707/797 |
| 8,301,100 B2 * | 10/2012 | Shiotsuki | ................. | H01Q 3/26 455/276.1 |
| 8,688,140 B2 * | 4/2014 | Nemeth | .................... | G01S 3/48 370/329 |
| 8,723,730 B2 * | 5/2014 | Lu | .............................. | G01S 5/04 342/464 |
| 8,830,122 B2 * | 9/2014 | Menegozzi | ............... | G01S 3/48 342/357.25 |
| 9,425,945 B2 * | 8/2016 | Sugahara | .............. | H04W 28/16 |
| 9,705,561 B2 * | 7/2017 | Henry | ...................... | H04B 3/52 |
| 2001/0040526 A1 * | 11/2001 | Smith | ..................... | G01S 3/023 342/418 |
| 2006/0087475 A1 * | 4/2006 | Struckman | ................ | G01S 5/04 342/451 |
| 2007/0018882 A1 * | 1/2007 | Manoogian | ......... | G01S 13/4418 342/80 |
| 2007/0273576 A1 * | 11/2007 | Struckman | .............. | G01S 3/146 342/156 |
| 2010/0169244 A1 * | 7/2010 | Zeljkovic | ............... | G06N 20/00 706/12 |
| 2011/0260911 A1 * | 10/2011 | Sapp | ........................ | G01S 3/10 342/156 |
| 2012/0313816 A1 * | 12/2012 | Menegozzi | ............... | G01S 3/48 342/357.25 |
| 2013/0202015 A1 * | 8/2013 | Frank | ................... | H04B 7/0632 375/219 |
| 2014/0159954 A1 * | 6/2014 | Stoddard | ................ | G01S 3/023 342/359 |
| 2015/0035696 A1 * | 2/2015 | Huard | ....................... | G01S 3/14 342/147 |
| 2016/0172767 A1 * | 6/2016 | Ray | ...................... | G06F 17/5063 343/893 |
| 2016/0363660 A1 * | 12/2016 | Gudim | ..................... | G01S 3/26 |

OTHER PUBLICATIONS

Gregoire, D.G., et al., "Advanced ESM AOA and Location Techniques," pp. 917-924, May 22, 1989 (XP010086621).
International Search Report and Written Opinion from related PCT Application No. PCT/US2016/023879 dated Jun. 27, 2016.

* cited by examiner

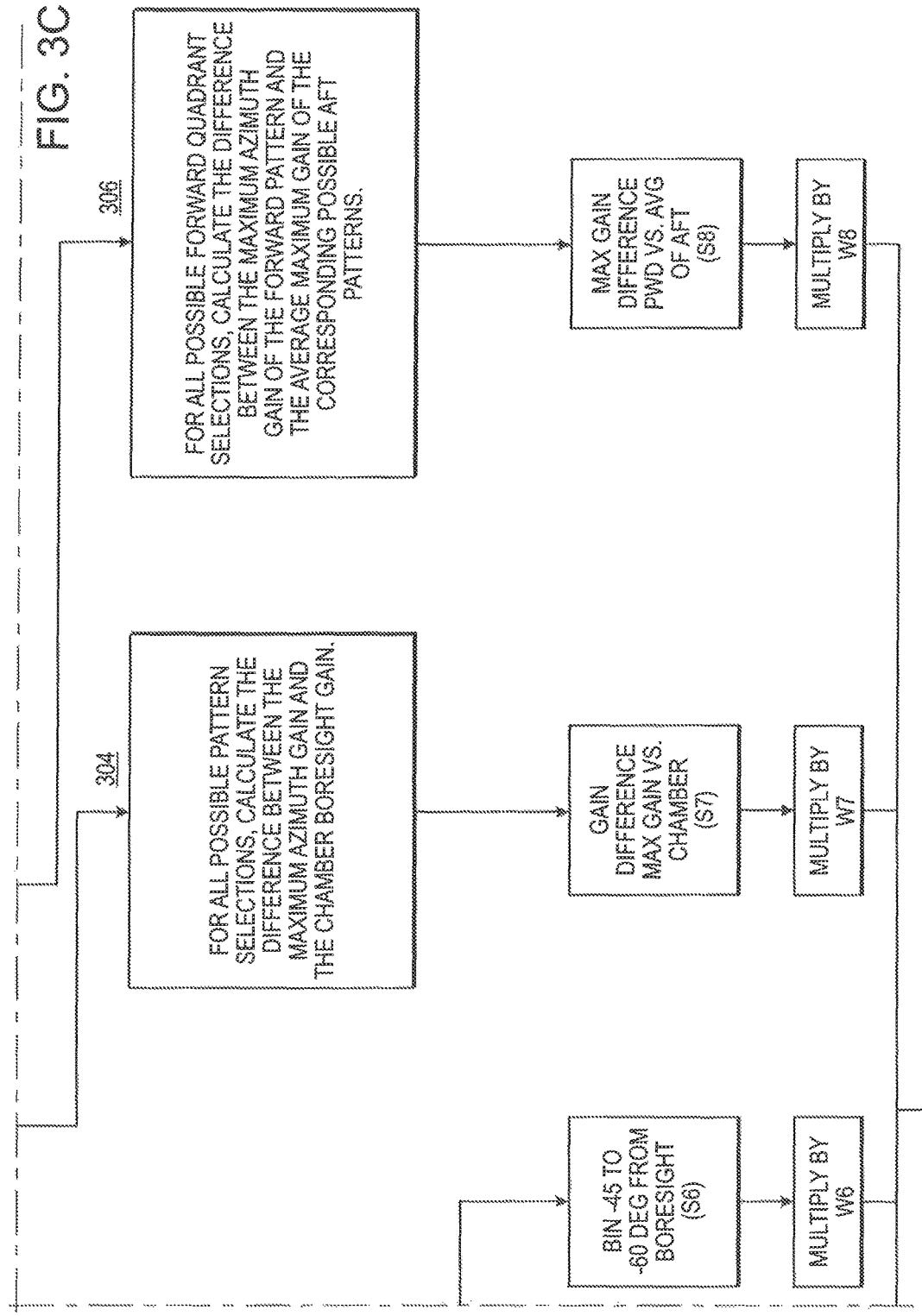

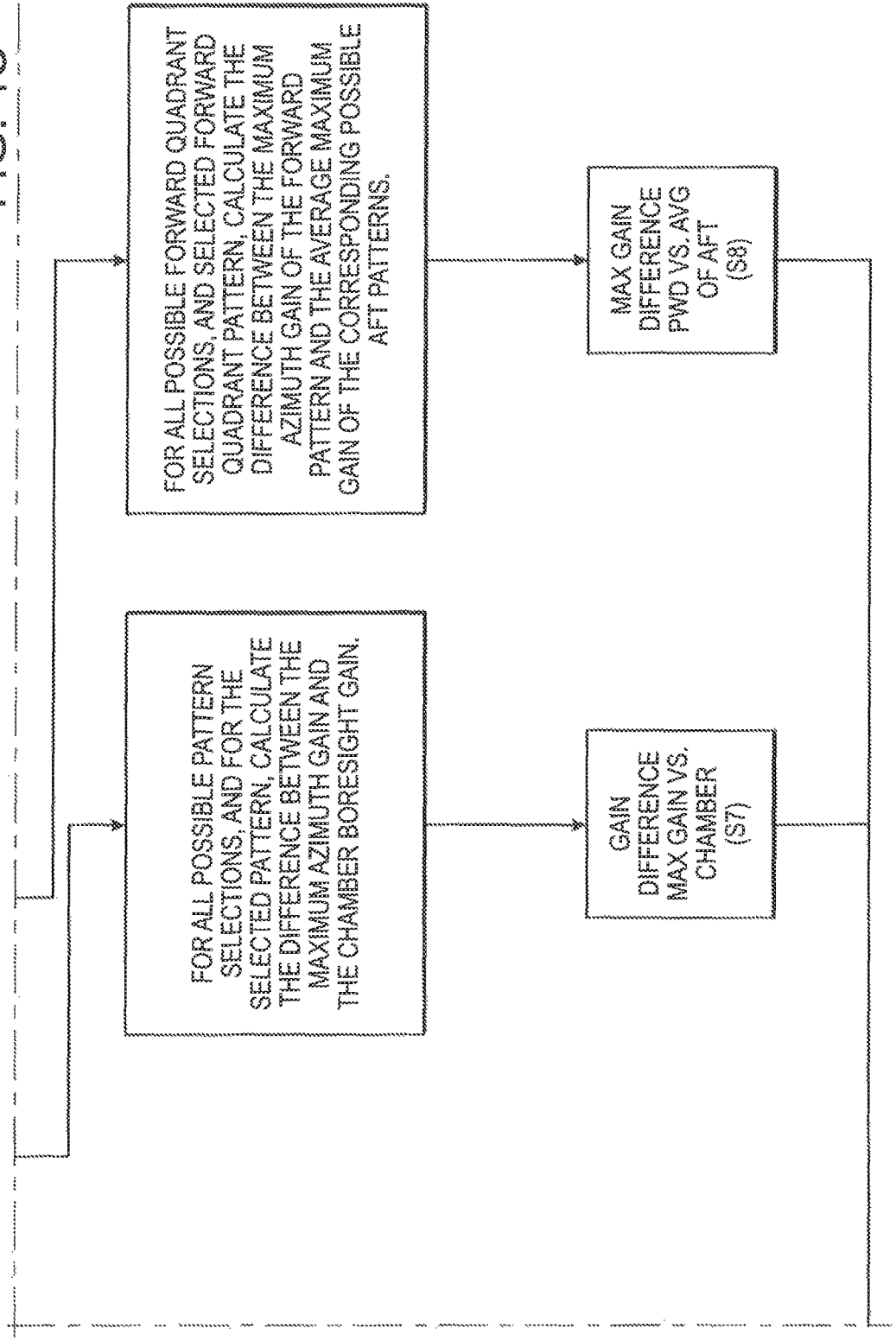

FIG. 5

| FIG. 5A | FIG. 5B |
|---------|---------|
| FIG. 5C | FIG. 5D | FIG. 5E | FIG. 5F |

FIG. 5A

 DATA COMPRESSION (PIECEWISE LINEAR METHOD)

 DATA COMPRESSION (PIECEWISE FUNCTION METHOD)

UNCOMPRESSED DIFFERENCE TABLES (A LOOK UP TABLE RELATING THE CHANNEL DIFFERENCE IN DECIBELS TO THE TRUE AZIMUTH ANGLE)

UNCOMPRESSED DIFFERENCE TABLE VERTICES

FOR EACH VERTEX PAIR, DETERMINE THE LINEAR SLOPE BETWEEN VERTICES IN THE PAIR

LINEAR SLOPE BETWEEN TWO VERTICES OF A VERTEX PAIR

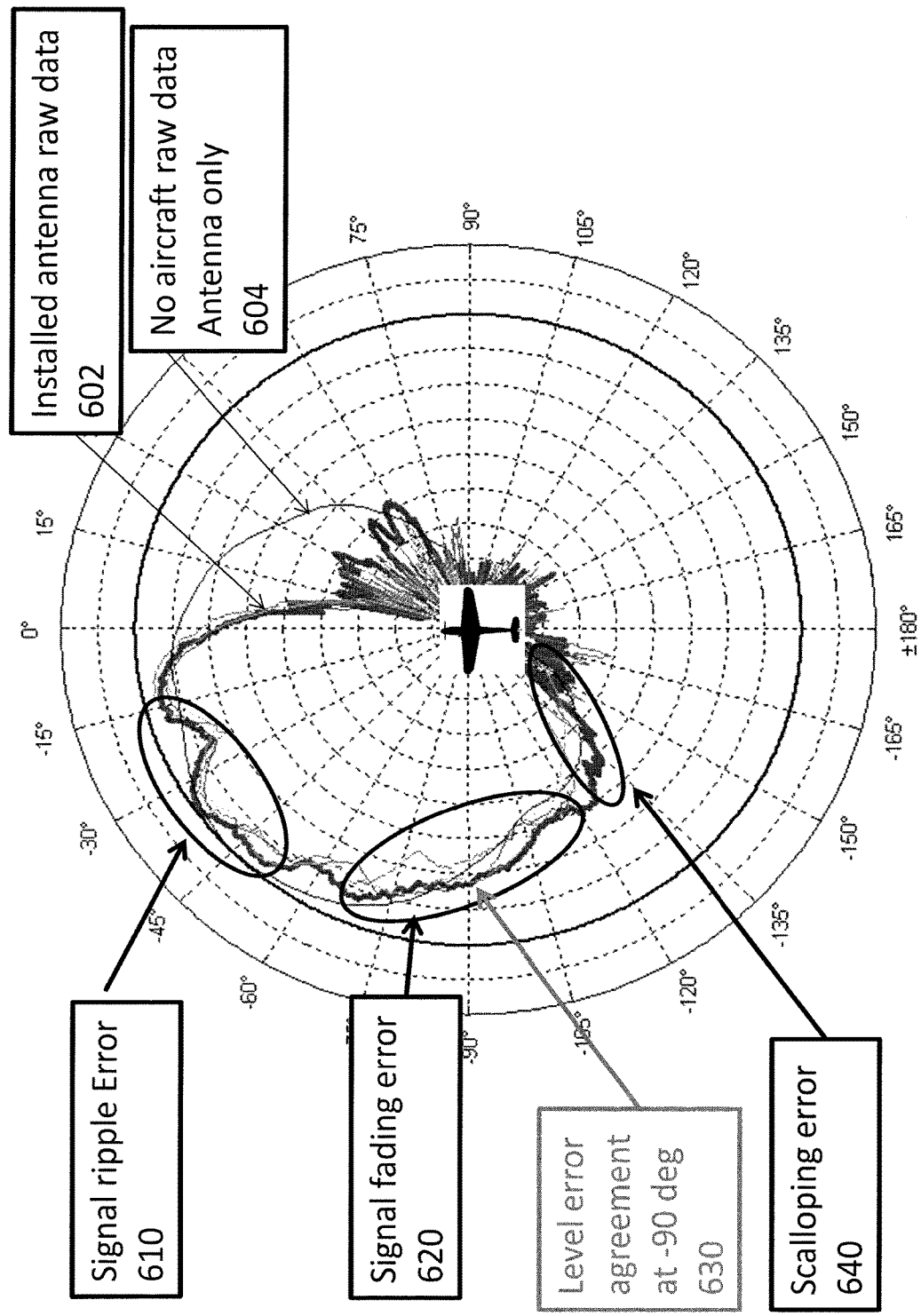

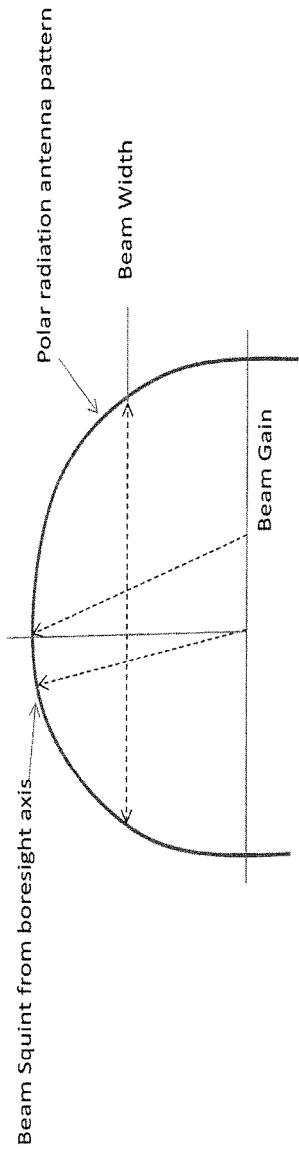
Figure 8
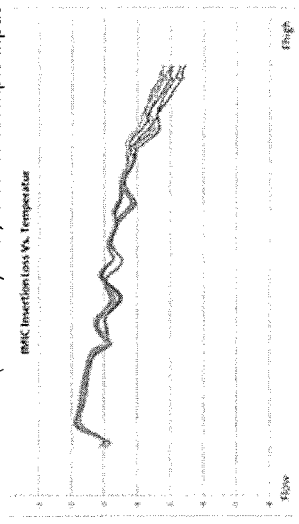
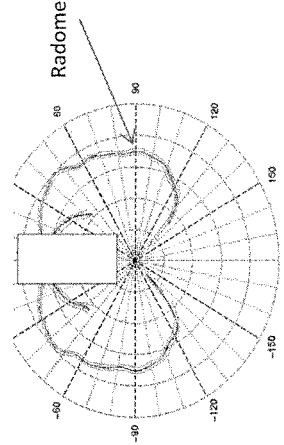
Figure 9
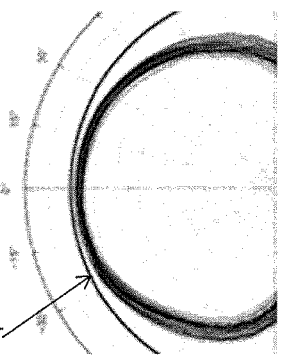
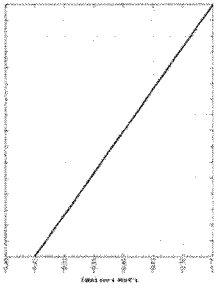

SYSTEMS AND METHODS FOR ANTENNA ANALYSIS AND VALIDATION

BACKGROUND

The subject application relates generally to the field of radar signal processing, and more particularly to an approach to generating and utilizing look-up tables for determining an angle of arrival of a radar signal received from an emitter.

Angle of Arrival (AoA) determination requires an accurate description of the antenna performance over azimuth or elevation angle while avoiding ambiguity. Currently, the standard industry practice is to curve fit the antenna radiation pattern. One criterion by which radar receivers, such as Radar Warning Receivers (RWR), are evaluated is the Root Mean Square (RMS) angular error, which is principally determined by the quality of the radiation pattern and the curve fit.

U.S. patent application Ser. No. 13/958,240 (published as U.S. Publication No. 2015/0035696), entitled "Optimized Monotonic Radiation Pattern Fit with Ambiguity Resolution" and filed Aug. 2, 2013 describes systems and methods for characterizing a radiation pattern of an antenna to improve the determination of an angle of arrival of a radar signal received by the antenna. In particular, U.S. patent application Ser. No. 13/958,240 features an optimized monotonic fitting approach to characterizing the radiation pattern. As disclosed therein, an approximation of the radiation pattern is represented as a window map having a plurality of windows. An optimized monotonic fit of the radiation pattern is determined by adjusting the window map, one window at a time, and testing the resulting new approximations. U.S. patent application Ser. No. 13/956,240 tangentially relates to example embodiments of the subject application and the entire contents thereof are hereby incorporated herein by reference.

U.S. Pat. No. 6,657,596, entitled "Method of Measuring a Pattern of Electromagnetic Radiation" and issued Dec. 2, 2003, describes systems and methods for measuring electromagnetic radiation patterns for antennas. U.S. Pat. No. 6,657,596 provides useful background information relating to measuring and characterizing antenna patterns and the entire contents thereof are hereby incorporated herein by reference.

RWR systems, e.g., such as described in U.S. patent application Ser. No. 13/958,240, require extensive analysis in order to validate system performance. System performance validation often includes evaluation of antennas, cables, microcircuits, receivers, and other signal sensors when installed on aircraft platforms and when uninstalled. Furthermore, performance needs to be assessed within hostile environments (hot, cold, vibrations, etc.). Typically, validation may include the evaluation of system "amplitude difference lookup tables," AoA, aircraft structure sensor interference, accuracy predictions, error identification, calibration processes, and other similar criteria.

Validation analyses are often not conjoined and typically require considerable time investment, and are not cost effective. Typically, the analysis of antenna radiation performance data is performed manually and occasionally with the aid of statistical tools. For example, an analyst may evaluate individual antenna radiation pattern plots for correct isotropic gain levels, beamwidth, and beam squint. This can involve several parallel manual analyses, such as effective antenna aperture gain predictions. Another example analysis is AoA calculation. Unfortunately, conventional AoA evaluations are not associated with other comparative analyses and therefore may often result in AoA calculation errors. Unreliable equipment setup and/or testing apparatus may also result in additional AoA calculation error. Furthermore, current practice is to limit frequency and polarization analyses by compensating with interpolation and extrapolation resulting in less accurate performance representation.

Thus traditional validation and evaluation methods are time consuming and prone to inaccurate determination. Under the conventional methods, it is often not possible to meet customer schedule when thousands of performance characterizations are required. Moreover, these methods fail to make use of High Power Computing (HPC) with distributive techniques. Conventional evaluation methods are also not able to perform comparative analyses in order to select the most useful solution.

Under conventional systems and methods, suboptimal antenna field of view radiation pattern performance may result from various inaccuracies such as measurement and calculation errors. Accordingly, systems and methods are needed in order to yield optimal antenna patterns.

SUMMARY

In example embodiments, methods are disclosed for generating a look-up table for determining an angle of arrival (AoA) of a radar signal received from an emitter. In example embodiments, these methods may include (i) for each of a plurality of antenna installation positions, selecting an installation-representative antenna pattern from an indexed plurality of data sets of antenna patterns associated with the antenna installation position, wherein the selected installation-representative antenna pattern is a most representative data set as scored against a predetermined set of weighted criteria; and (ii) calculating and recording differences between the selected installation-representative patterns for each set of adjacent antenna installation positions in a look-up table. In some embodiments, the selected antenna pattern for each of the plurality of antenna installation positions may be stored in a selectivity table.

In example embodiments, the indexed plurality of data sets of antenna patterns may include a plurality of measured family-representative installed antenna patterns. Thus, e.g., the measured family-representative installed antenna patterns may be normalized relative to an antenna chamber pattern such as where the antenna chamber pattern is an average antenna chamber pattern for the family. In further example embodiments, the indexed plurality of data sets further includes mirrored data sets of measured family-representative installed antenna patterns for other antenna installation positions, mirrored with respect to a mounting platform. In some embodiments, the mirrored data sets may be mirrored front to back. In other embodiments, the mirrored data sets may be mirrored side to side. In further example embodiments, the indexed plurality of data sets further may include mirrored data sets of the measured family-representative installed antenna patterns, mirrored with respect to the antenna. In some embodiments, the plurality of data sets of antenna patterns may be evaluated with respect to each of a plurality of angle bins around a boresight.

In example embodiments, selecting the installation-representative antenna pattern from the indexed plurality of data sets may include scoring each indexed data set against the predetermined set of weighted criteria and choosing a data set having the greatest possible score. In some embodiments, a training set may be utilized to facilitate determining relative weighting factors for the set of weighted criteria. For example, a machine learning approach may be applied to determine a scoring algorithm as a function of the set of weighted criteria.

In example embodiments, the differences between selected installation-representative patterns for each set of adjacent installation positions may be indexed by true azimuth angle.

In example embodiments, a ratio of antenna pattern gains may be calculated for each set of adjacent installation positions based on the selected installation-representative antenna patterns for those positions. In some embodiments, the ratio of antenna pattern gains may be expressed as a difference in decibel units. In example embodiments, the ratio of antenna pattern gains may use an optimized monotonic process. For example, the ratio of antenna pattern gains may be calculated based on an absolute value of the difference between optimized monotonic fits for the selected installation-representative antenna patterns.

In example embodiments, the look-up table relating pattern difference data with respect to antenna installation position is utilized to calculate the AoA of a radar signal. In some embodiments, methods may further include compressing the data in the look-up table utilizing a compression algorithm which (i) identifies changes in slope with respect to adjacent pairs of antenna installation positions in the look-up table and (ii) discards any antenna installation position that does not meet a slope difference threshold with respect to the changes in the slope. In some embodiments, at least a portion of the compressed data may be represented linearly. In other embodiments at least a portion of the compressed data may be represented by a piecewise function calculated based in part on points of inflection where slope changes sign.

In example embodiments, methods are presented for compressing data in a pattern difference look-up table. In general such methods may include (i) identifying changes in slope with respect to adjacent pairs of antenna installation positions in the look-up table and (ii) discarding any antenna installation position that does not meet a slope difference threshold with respect to the changes in the slope.

For a better understanding of the present teachings, together with other and further objects thereof, reference is made to the accompanying drawings and detailed description.

BRIEF DESCRIPTION OF THE DRAWINGS

FIGS. 3A-3D are sub-Figures of FIG. 3 representing partitions of FIG. 3 as illustrated and referenced in FIG. 3, according to the present disclosure.

FIGS. 4A-4D are sub-Figures of FIG. 4, representing partitions of FIG. 4 as illustrated and referenced in FIG. 4, according to the present disclosure.

FIG. 5 depicts an exemplary compression algorithm, as further illustrated in and described with respect to sub-FIGS. 5A-5F, according to the present disclosure.

FIGS. 5A-5F are sub-Figures of FIG. 5, representing partitions of FIG. 5 as illustrated and referenced in FIG. 5 therein, according to the present disclosure.

FIGS. 6-10 illustrate exemplary data analysis of antenna patterns using a selectivity process, according to the present disclosure.

DETAILED DESCRIPTION

Figure 1:
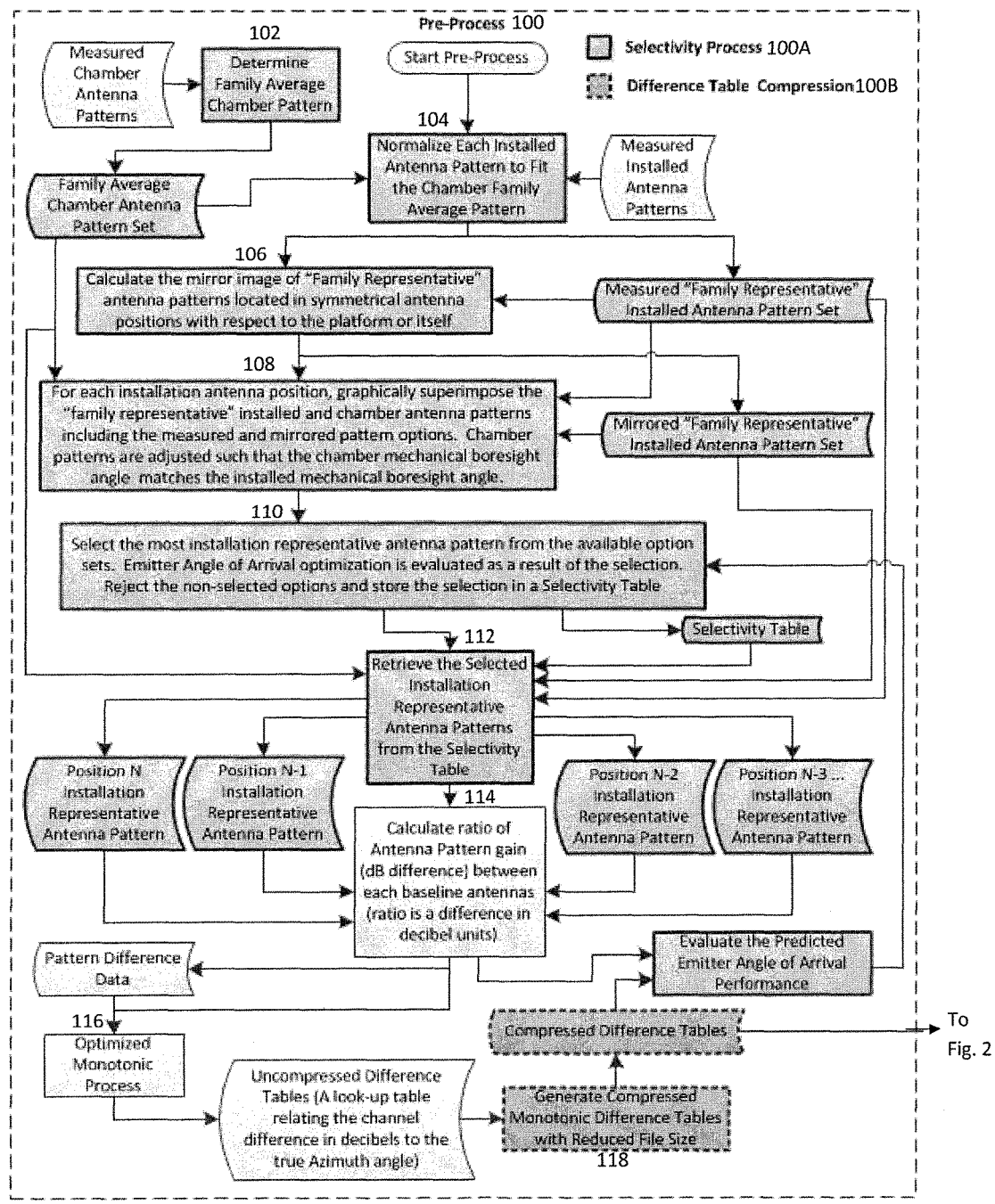
FIGS. 1 and 2 depict exemplary algorithms for generating (FIG. 1) and utilizing (FIG. 2) pattern difference look-up tables, according to the present disclosure.

Systems and methods are disclosed herein which facilitate generating and utilizing look-up tables for determining an AoA of a radar signal received from an emitter. In example embodiments, the systems and methods may involve a selectivity process for selecting, for each of a plurality of installation positions, an installation-representative antenna pattern as selected from an option set. Thus, the selectivity process may, for example, include indexing a plurality of data sets of antenna patterns associated with an antenna position and selecting a most representative data set from at least one of the indexed data sets. Advantageously, the step of selecting a most representative data set may, in some embodiments, include scoring each indexed data set against a set of weighted criteria and choosing a data set having the greatest possible score based upon all possible pattern selections against the predetermined weighted selection criteria. Advantageously, a training set may be utilized to facilitate determining relative weighting factors for the weighted criteria. In some embodiments, a machine learning approach (e.g., SVM, neural net, decision tree or the like) may be applied to determine a scoring algorithm as a function of the weighted criteria (e.g., wherein the scoring algorithm may appropriately reflect and account for the relative weighting between the criteria).

Selected installation-representative antenna patterns for each installation position (e.g., resulting from the selectivity process) may be stored in a selectivity table for further analysis and evaluation whereas non-selected antenna patterns may be rejected/discarded. Advantageously, AoA performance may be evaluated based on the selected installation-representative antenna patterns. Thus, differences between selected installation-representative patterns for each set of adjacent installation positions (pattern difference data) may be calculated and recorded, such as in a look-up table, e.g., as indexed by position (e.g., by true azimuth angle). For example, a ratio of antenna pattern gains may be calculated for each set of adjacent installation positions based on the selected installation-representative antenna patterns for those positions.

The ratio may be expressed, e.g., as a difference in decibel units (dB difference). In example embodiments, the calculation of the ratio of antenna pattern gains may involve an optimized monotonic process, e.g., such as described in U.S. patent application Ser. No. 13/958,240. Thus, for example, in some embodiments, the ratio of antenna pattern gains may be calculated based on the absolute value of the difference between optimized monotonic fits for the selected installation-representative antenna patterns.

Similar to as is disclosed with respect to FIGS. 10A and 10B of U.S. patent application Ser. No. 13/958,240, look-up tables described herein relating pattern difference data with respect to antenna position (e.g., with respect to true azimuth angle) may be utilized to calculate the AoA of a radar signal. Thus, the various antenna positions are compared to determine which one has the highest effective radiated power (ERP). The sector containing the installation position with the highest ERP is referred to herein as the emitter sector. The emitter sector and the next strongest adjacent sector are compared and an ERP ratio of the two sectors is calculated (which may be calculated as a difference of the two ERPs when expressed in decibel units). The ERP ratio may be used to resolve the AoA, e.g., in the azimuth plane, based on the look-up table. Advantageously, the emitter sector and sub-sector (e.g., quadrant and octant) may be used to restrict the search domain within the difference table for resolving the AoA.

Notably, pattern difference data look-up tables, such as described herein, may be compressed using various compression algorithms. In example embodiments, a monotonic optimization process may be applied to produce a compressed monotonic (e.g., monotonically increasing or decreasing) look-up table. See, e.g., U.S. patent application Ser. No. 13/958,240. In some embodiments, other compression algorithms may be applied separately or in conjunction with the monotonic optimization process.

In example embodiments, the system and methods may utilize a compression algorithm which identifies changes in slope with respect to adjacent pairs of antenna positions (vertex pairs) in the look-up table. The algorithm then discards any antenna position (any vertex) that does not meet a slope difference threshold with respect to changes in the slope. In exemplary embodiments, the compressed data may be represented linearly, e.g., as a monotonic piece-wise linear representation, using the difference data for the remaining antenna positions, e.g., for the remaining vertices. Alternatively, the compressed data may be represented using one or more piecewise functions. For example, points of inflection may be determined based on the slope of the look-up table changing sign, (e.g., with respect to adjacent pairs of antenna positions either prior to the slope difference threshold discarding of vertices or subsequent thereto). Piecewise functions may then be calculated/determined between adjacent vertices which reflect the points of inflection.

Based on empirical testing to date, the systems and methods described herein have proven to be exceptional in reducing validation time and cost and have proven useful for identifying outlier performances in sensor perturbations. The selectivity algorithm and associated interface advantageously enable a user to select aircraft elevations, polarizations, performance mirroring, signal ports, installed and/or chamber performance, and the like as part of the validation process. Thus, generated look-up tables (e.g., for determining AoA) may account for a complete system performance (e.g., antenna, cable, cords, installation configuration, etc.) as opposed to just accounting for the antenna. Thus the systems and methods of the present disclosure have the ability to map the installed field of view performance in 3 dimensions (3D) onto a full size aircraft. Screening processes evaluate the free space (no aircraft) antenna family performance variance with correlation to aircraft installed performance. This process is capable of making use of HPC distributive methods for improved computational processing time. Furthermore, the systems and methods of the present disclosure are able to substantially reduce the memory size for look-up tables, e.g., by applying various compression algorithms disclosed herein.

Figure 2:
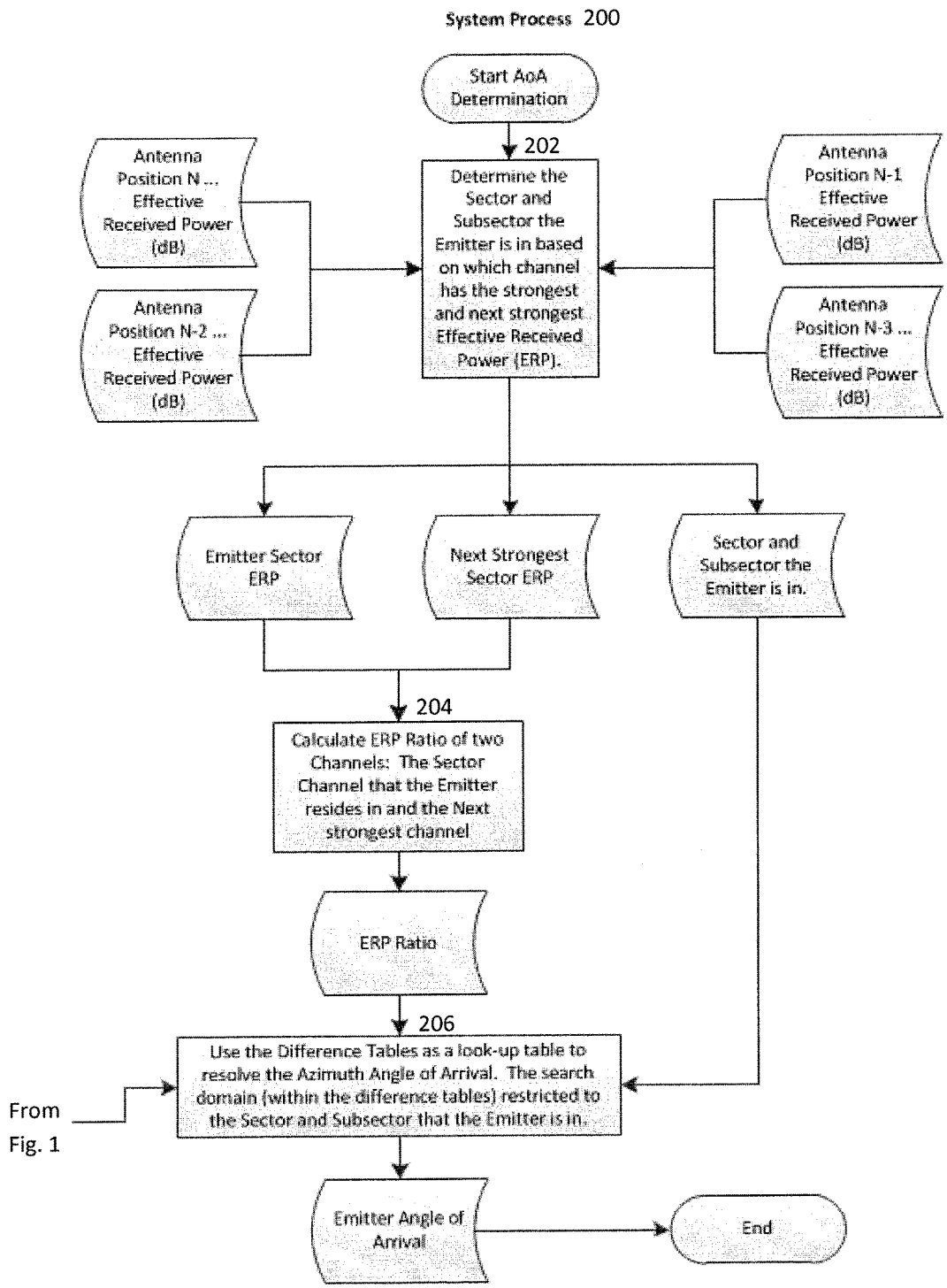

With initial reference to FIGS. 1 and 2 an example algorithm for generating and utilizing pattern difference look-up tables is depicted. More particularly, FIG. 1 depicts a pre-process 100 for generating a pattern difference look-up table and FIG. 2 depicts a system process 200 for resolving AoA based on the generated look-up table of FIG. 1.

With specific reference to FIG. 1, the pre-process 100 may advantageously include a selectivity process 100A and a data compression process 100B, as part of the generation of the pattern difference look-up table. In general the selectivity process 100A may include indexing a plurality of data sets of antenna patterns associated with an antenna position and selecting a most representative data set from at least one of the indexed data sets. As reflected in FIG. 1 example embodiments indexing the plurality of data sets of antenna patterns may include steps of e.g., 102 determining a family average chamber pattern (e.g., based on measured antenna chamber patterns), 104 normalizing each installed antenna pattern to fit the family average chamber pattern (e.g., based on measured installed patterns to produce a measured family-representative installed antenna pattern set) and 106 calculating mirror images for the measured family-representative installed antenna pattern set and the family average chamber pattern (e.g., with respect to the platform and/or with respect to the antenna itself). Advantageously, for each installation antenna position, each indexed antenna pattern (e.g., the original and mirrored family average chamber pattern and measured family-representative installed antenna pattern set) may be superimposed (e.g. with the mechanical boresight angles matching). Outlier patterns may then be easily identified and rejected. At step 110 a most installation-representative antenna pattern may be selected from the indexed patterns (e.g., for later utilization in the generation of the pattern difference look-up table for AoA resolution). Notably, the selected antenna pattern for each antenna installation position may be stored in a selectivity table. An example algorithm for selecting the most installation-representative antenna patterns is described with respect to FIGS. 3 and 4, herein.

At step 112 the selected installation-representative antenna patterns are retrieved from the selectivity table and at step 114 differences between selected installation-representative patterns for each set of adjacent installation positions (pattern difference data) is calculated and recorded, such as in a look-up table, e.g., as indexed by position (e.g., by true azimuth angle). For example, a ratio of antenna pattern gains may be calculated for each set of adjacent installation positions based on the selected installation-representative antenna patterns for those positions. The ratio may be expressed, e.g., as a difference in decibel units (dB difference). In example embodiments, the calculation of the ratio of antenna pattern gains may involve an optimized monotonic process, e.g., such as described in U.S. patent application Ser. No. 13/958,240. Thus, for example, in some embodiments, the ratio of antenna pattern gains may be calculated based on the absolute value of the difference between optimized monotonic fits for the selected installation-representative antenna patterns. In other embodiments, a monotonic compression may be applied with respect to the pattern difference data. Finally, at step 118 a compression algorithm may be applied for compressing the data in the pattern difference look-up table. An example compression algorithm is described with respect to FIG. 5, herein.

With reference now to FIG. 2, the look-up table generated according to the pre-process 100 of FIG. 1 may be utilized as part of a system process 200 to calculate the AoA of a radar signal. Thus, at step 202, the various antenna positions are compared to determine which one has the highest ERP. The identified installation position with the highest ERP is referred to herein as the emitter sector. At step 204, the emitter sector and the next strongest adjacent sector are compared and an ERP ratio of the two sectors is calculated (which may be calculated as a difference of the two ERPs when expressed in decibel units). The ERP ratio may then be used at step 206 to resolve the AoA, e.g., in the azimuth plane, based on the look-up table. Advantageously, the emitter sector and subsector (e.g., quadrant and octant) may be used to restrict the search domain within the difference table for resolving the AoA.

Figure 3:
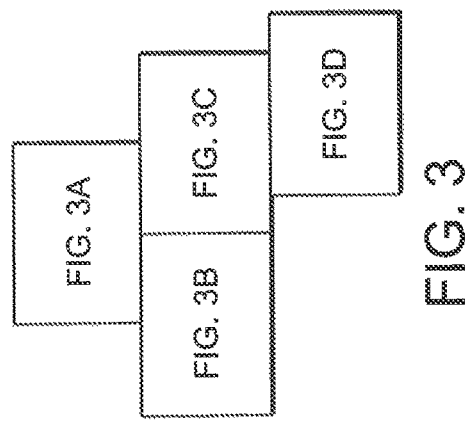
FIG. 3 depicts an exemplary automatic selectivity algorithm, as further illustrated in and described with respect to sub-FIGS. 3A-3D, according to the present disclosure.
Figure 3A:
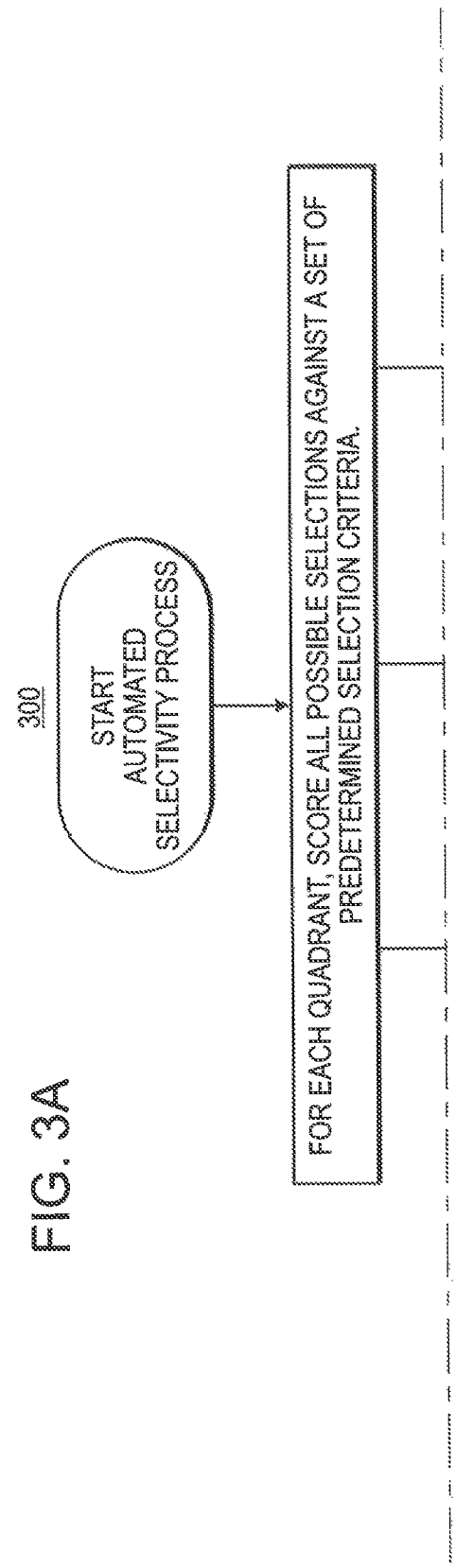
Figure 3B:
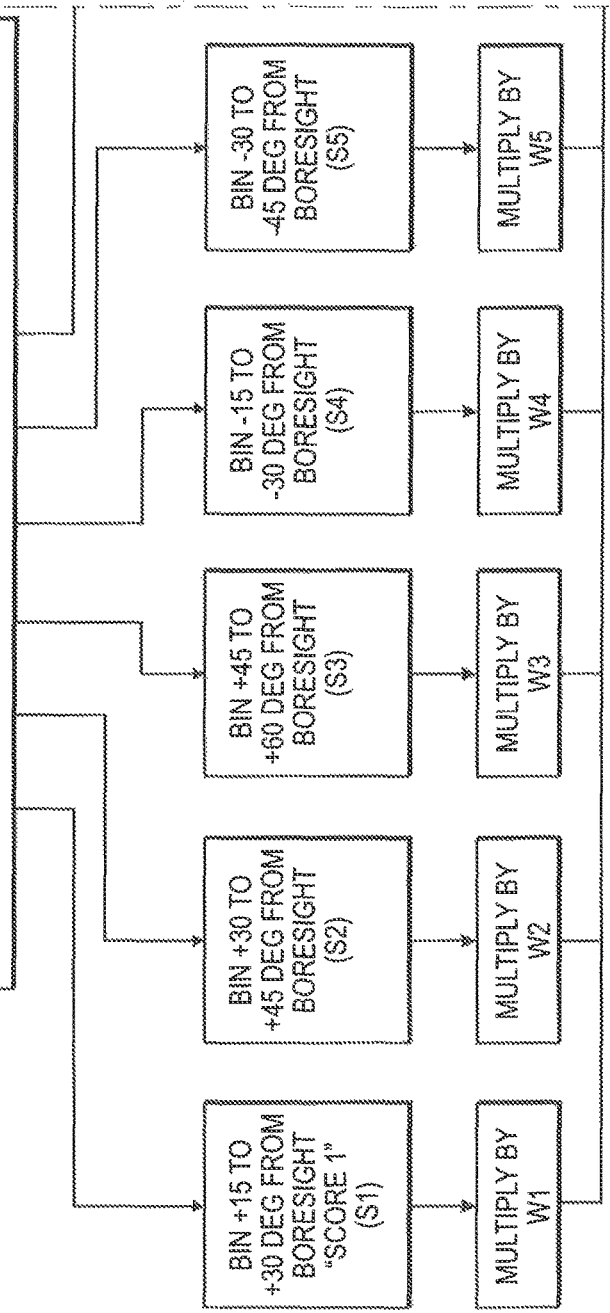
Figure 3D:
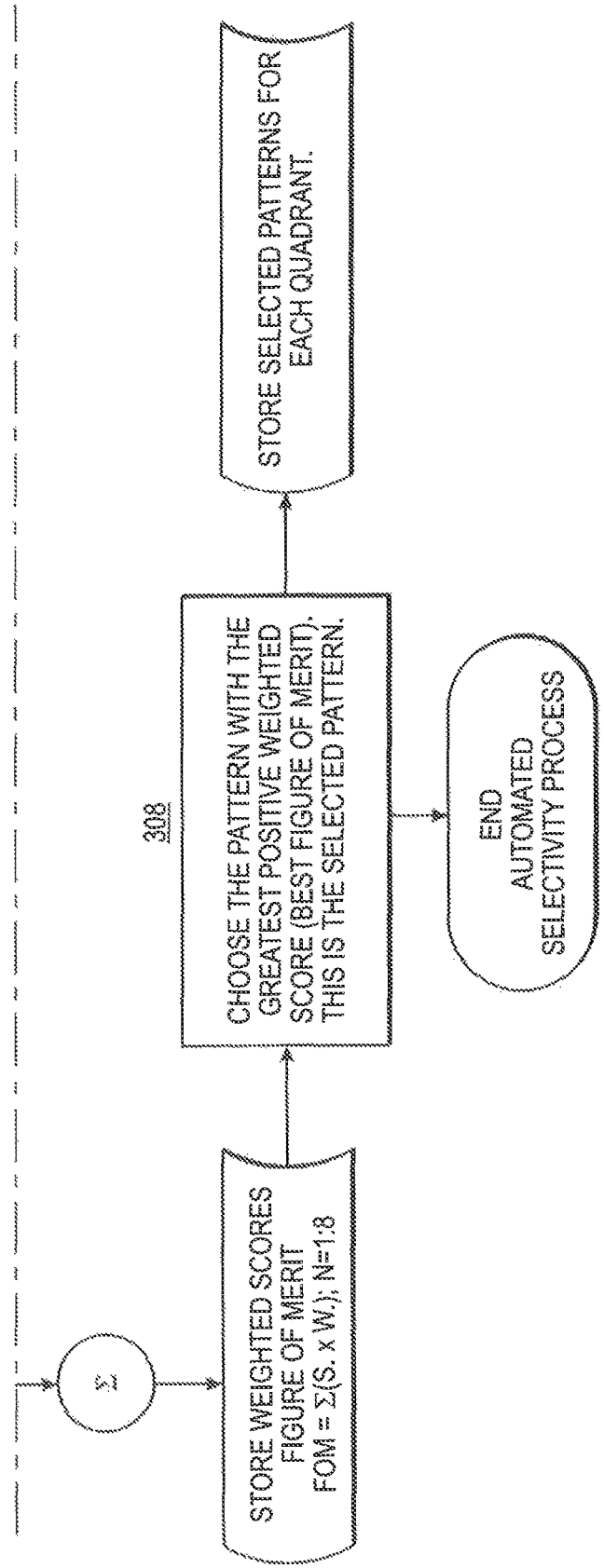

With reference now to FIG. 3 and sub-FIGS. 3A-3D, an exemplary automatic selectivity algorithm 300 is presented for scoring and selecting a most representative installation pattern, e.g., for a particular application based on a predetermined set of criteria. In particular, algorithm 300 may include steps of scoring each indexed data set against a set of weighted criteria and choosing a data set having the greatest possible score based upon all possible pattern selections against the predetermined weighted selection criteria. In the example embodiment of FIG. 3 and sub-FIGS. 3A-3D, algorithm 300 includes at step 310, for each possible pattern selection, calculating a correlation between the pattern selection (after normalization thereof) and the chamber pattern in a plurality of azimuth bins (e.g., relative to the antenna boresight). In particular, a standard deviation may be calculated for each bin, e.g., to evaluate pattern scalloping. In exemplary embodiments, the bins may be +15 to +30, +30 to +45, +45 to +60, −15 to −30, −30 to −45, and −45 to −60 from the antenna azimuth boresight angle. In exemplary embodiments, each correlation with respect to one of the bins may represent a separate scoring criterion (e.g., with a separate weighting factor). As depicted in FIG. 3 and sub-FIGS. 3A-3D, other scoring criteria may include, e.g., for each possible pattern selection, at step 304 calculating gain difference between max azimuth gain of the pattern and the chamber boresight gain and/or at step 306 (in the case of a forward pattern) calculating a difference between maximum azimuth gain of the forward pattern and the average maximum gain of the corresponding possible aft patterns. It is noted that other criteria may be utilized in determining the scoring parameters. Moreover, each of the criteria may be separately weighted in determining an overall weighted score for each indexed pattern. Notably, at step 308 the highest scoring pattern may be selected, e.g., for the selectivity table and further processing such as described in FIG. 1.

Figure 4:
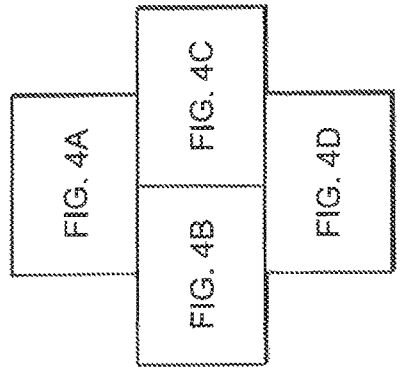
FIG. 4 depicts an exemplary training method for the selectivity algorithm of FIG. 3 and sub-FIGS. 3A-3D, as further illustrated in and described with respect to sub-FIGS. 4A-4D, according to the present disclosure.
Figure 4A:
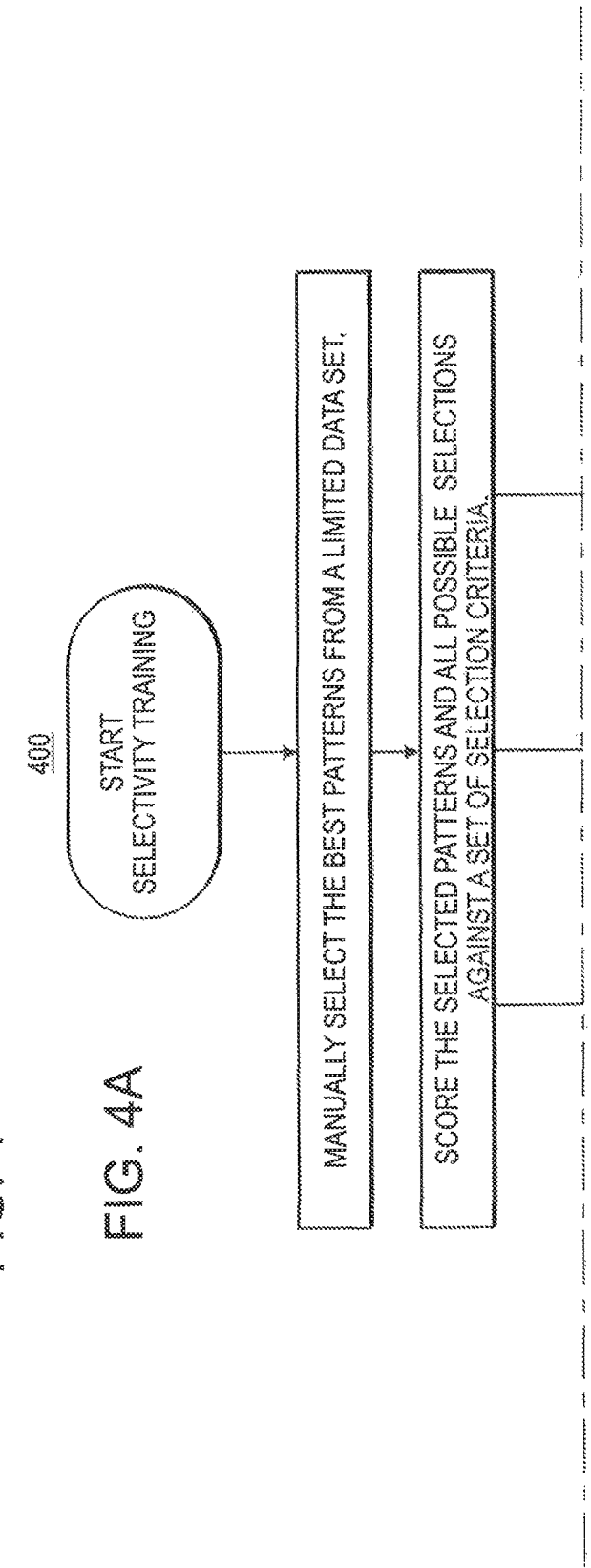
Figure 4B:
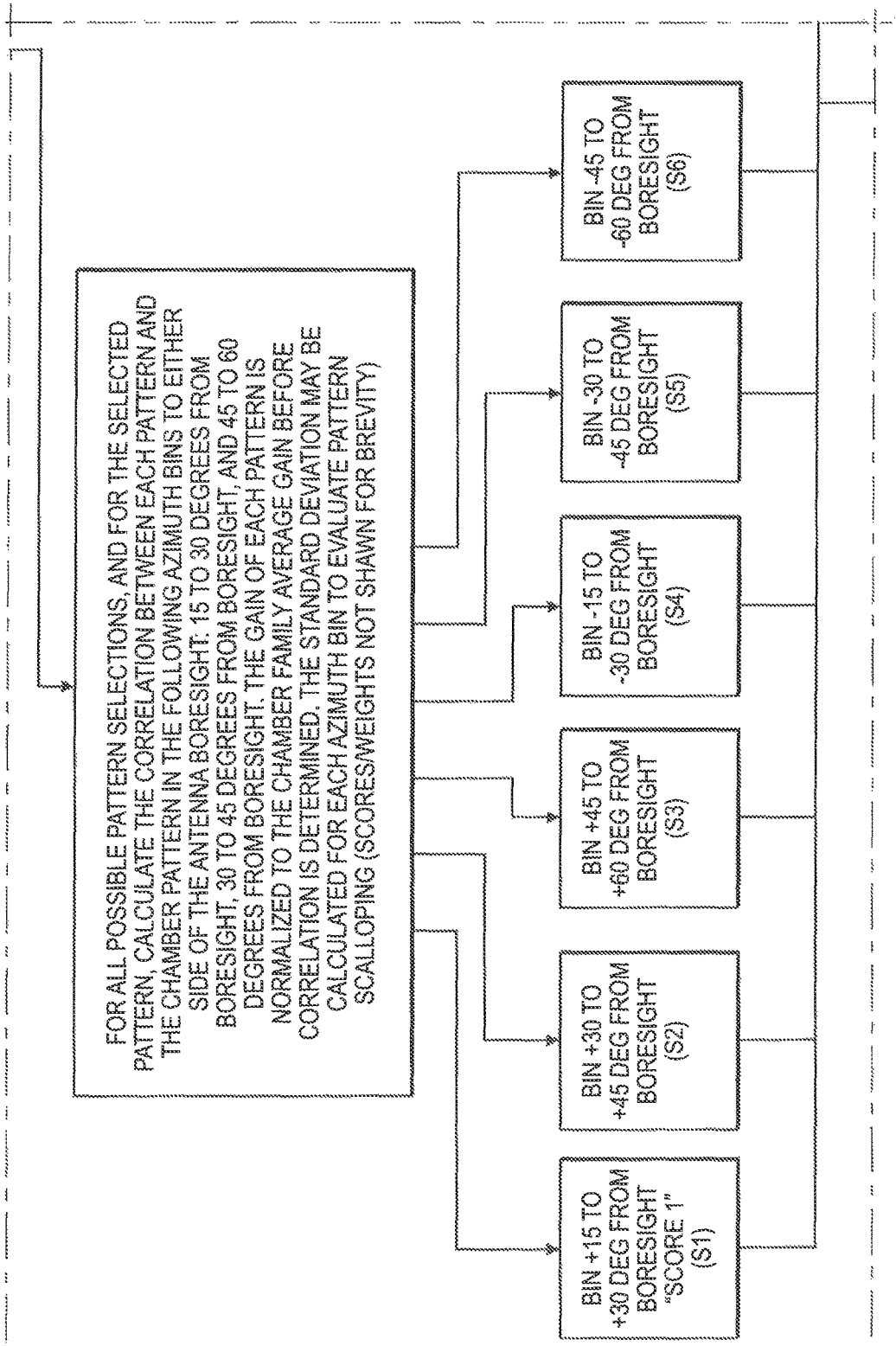
Figure 4D:
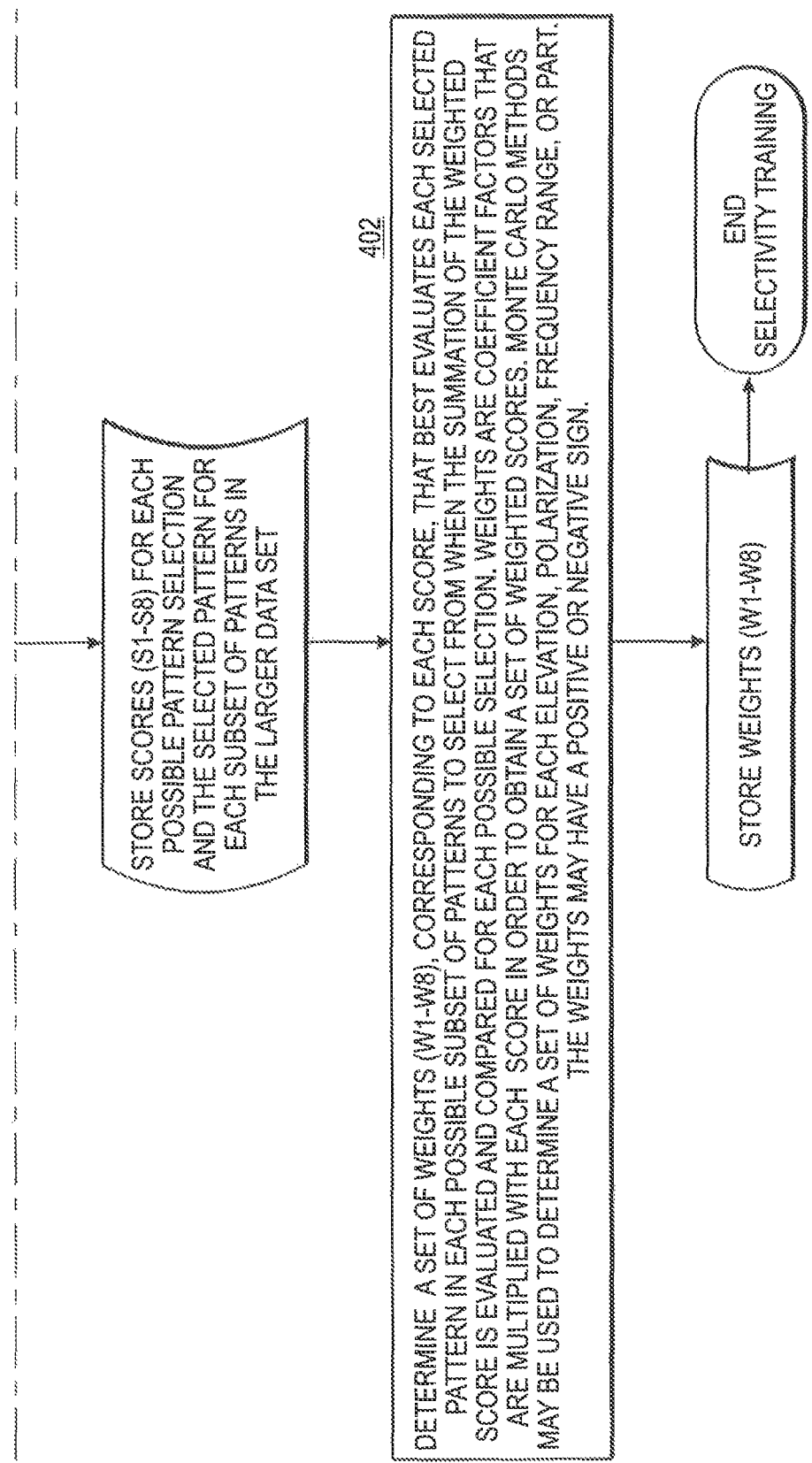
Figure 5B:
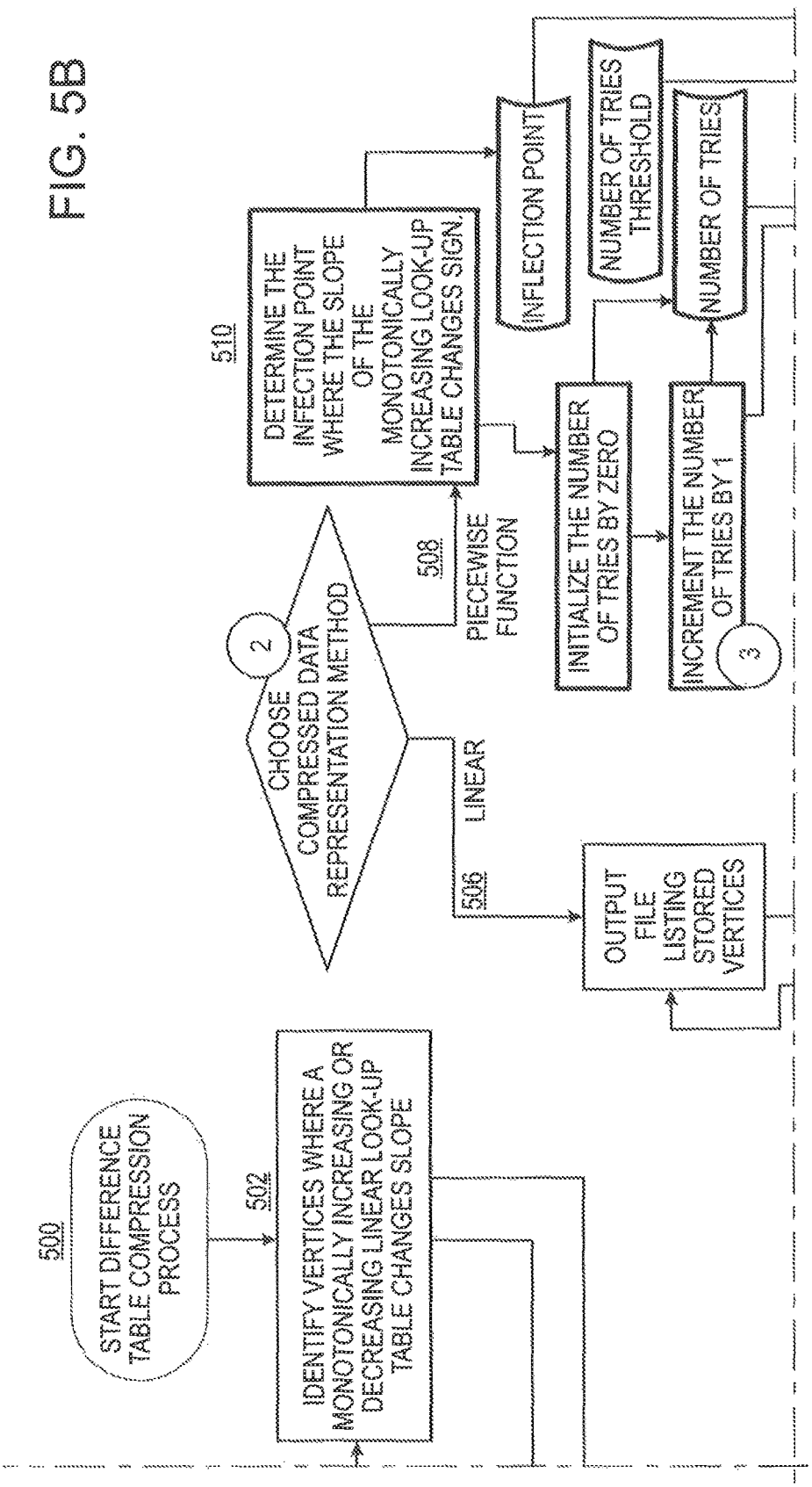
Figure 5C:
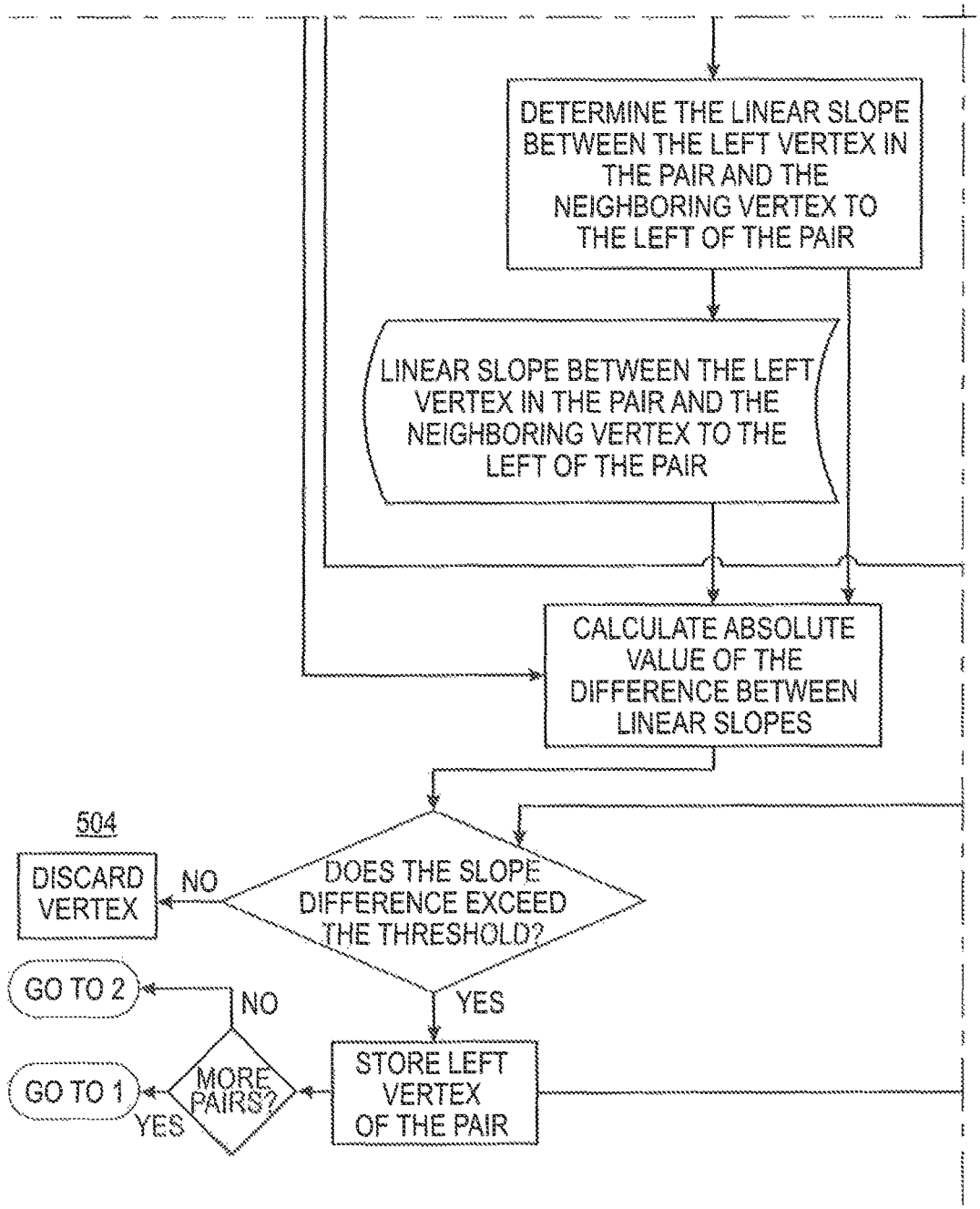
Figure 5D:
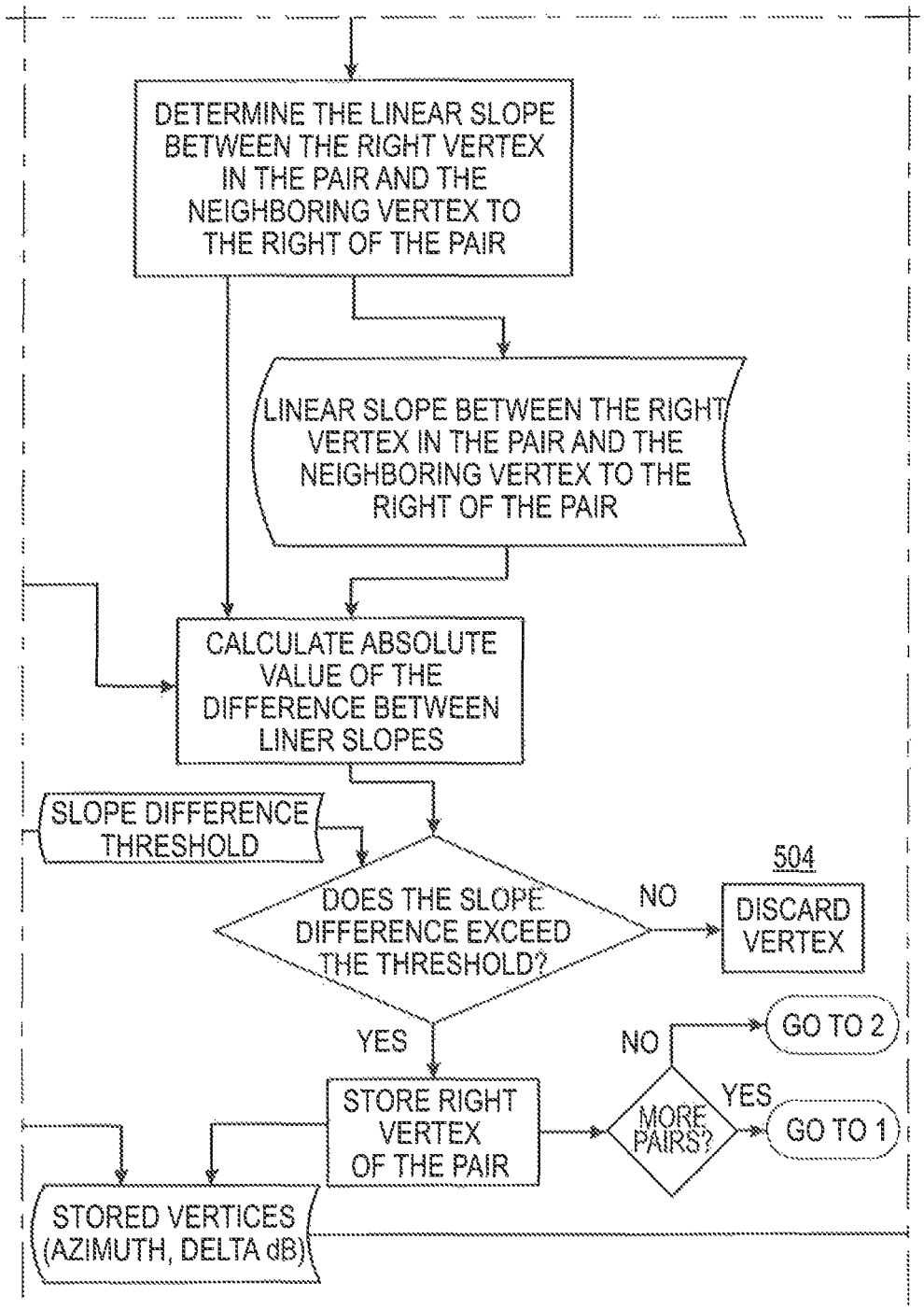
Figure 5E:
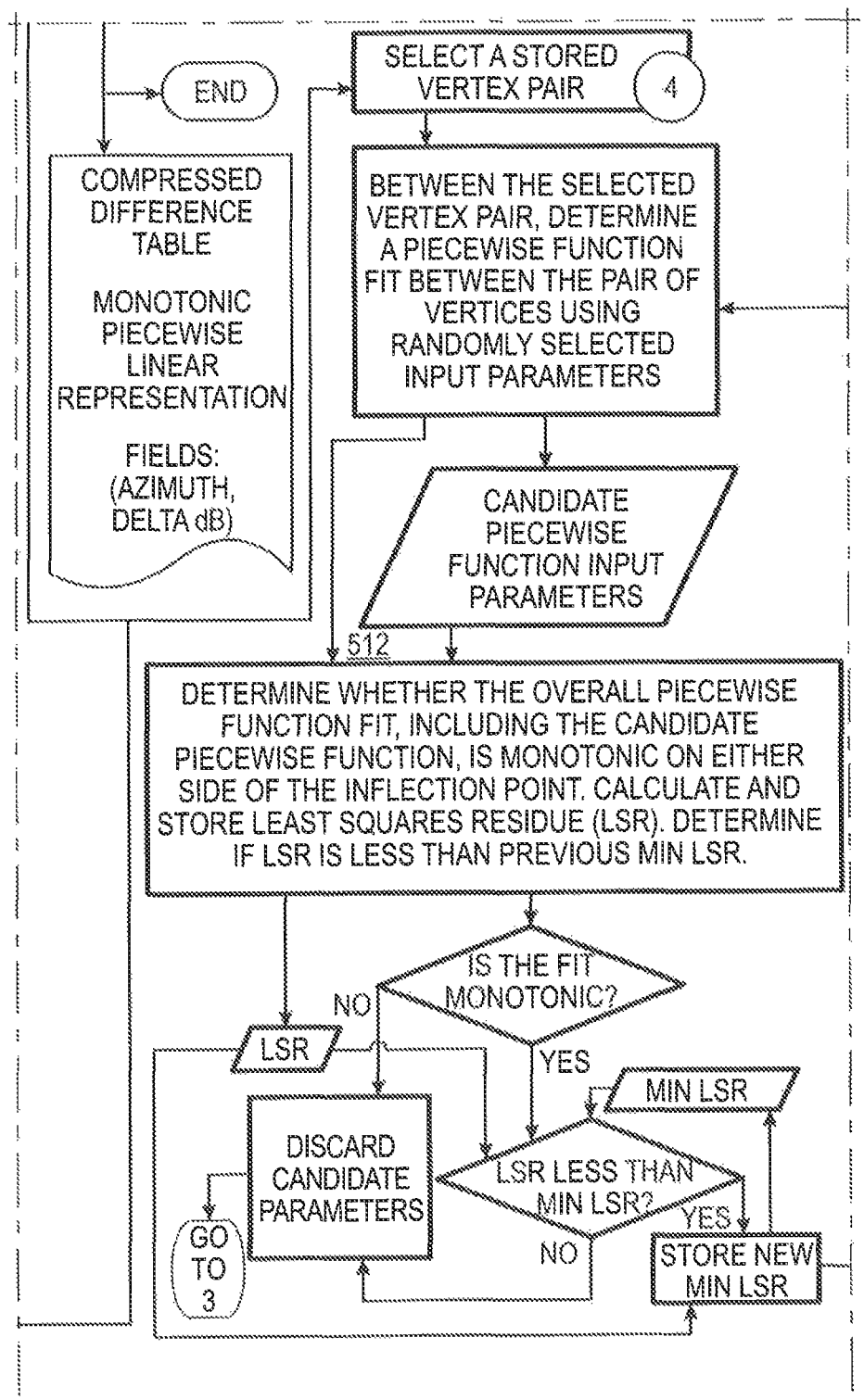
Figure 5F:
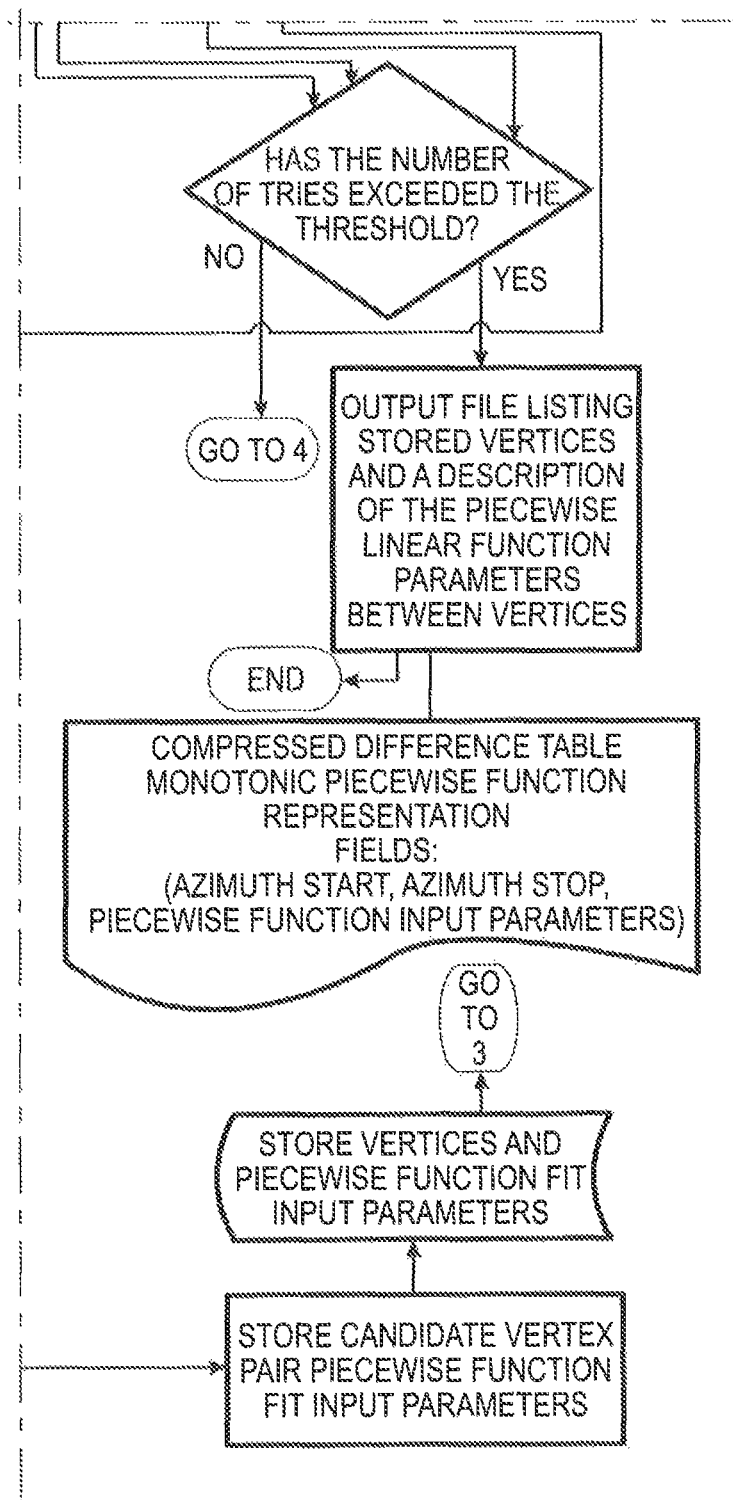

As depicted in FIG. 4 and sub-FIGS. 4A-4D, in some embodiments, a training set may be utilized, e.g., to facilitate determining relative weighting factors for the weighted criteria. Thus, according to the training algorithm 400 of FIG. 4 and sub-FIGS. 4A-4D, weight factors may be calculated at step 402 for each of a plurality of criteria so as to best represent a plurality of selected patterns in a training set, e.g., relative to the other non-selected patterns in the training set. In some embodiments, a machine learning approach (e.g., SVM, neural net, decision tree or the like) may be applied to determine a scoring algorithm as a function of the weighted criteria (e.g., wherein the scoring algorithm may appropriately reflect and account for the relative weighting between the criteria).

With reference now to FIG. 5, an exemplary compression algorithm 500 is depicted for reducing the memory load of a pattern difference look-up table. The compression algorithm 500, advantageously, at step 502 identifies changes in slope with respect to adjacent pairs of antenna positions (vertex pairs) in the look-up table and then at step 504 discards any antenna position (any vertex) that does not meet a slope difference threshold with respect to the changes in the slope. In particular, as depicted in FIG. 5 and sub-FIGS. 5A-5F, for each vertex pair the algorithm calculates the slope between the vertices of the vertex pair as well as the slope between the left vertex of the pair and the neighboring vertex to the left of the pair and the slope between the right vertex of the pair and the neighboring vertex to the right of the pair. A slope difference is then calculated between the slope of the vertex pair and the slope between the left vertex of the pair with the left neighboring vertex. If the slope difference with respect to the left vertex is less than a predetermined threshold the left vertex of the pair is discarded.

Similarly, a slope difference may be calculated between the slope of the vertex pair and the slope between the right vertex of the pair with the right neighboring vertex. As with the left vertex, if the slope difference with respect to the right vertex is less than a predetermined threshold, the right vertex of the pair is discarded.

As depicted in FIG. 5 and sub-FIGS. 5A-5F, the compressed data may be represented linearly 506, e.g., as a monotonic piecewise linear representation, using the difference data for the remaining antenna positions, e.g., for the remaining vertices. Alternatively, the compressed data may be represented using one or more piecewise functions 508. For example, at step 510 points of inflection may be determined based on the slope of the look-up table changing sign, (e.g. with respect to adjacent pairs of antenna positions either prior to the slope difference threshold discarding of vertices or subsequent thereto). Piecewise functions which reflect the points of inflection may then be calculated/determined (e.g., at step 512) between adjacent vertices. Notably, the piecewise fitting process may be a recursive/iterative process with a threshold number of iterations prior to selecting the best candidate parameters for the piecewise function. Notably, in some embodiments the piecewise function should be monotonic on either side of an inflection point. In some embodiments, a combination of linear and piecewise functions may be used in representing the data table.

Figure 7:
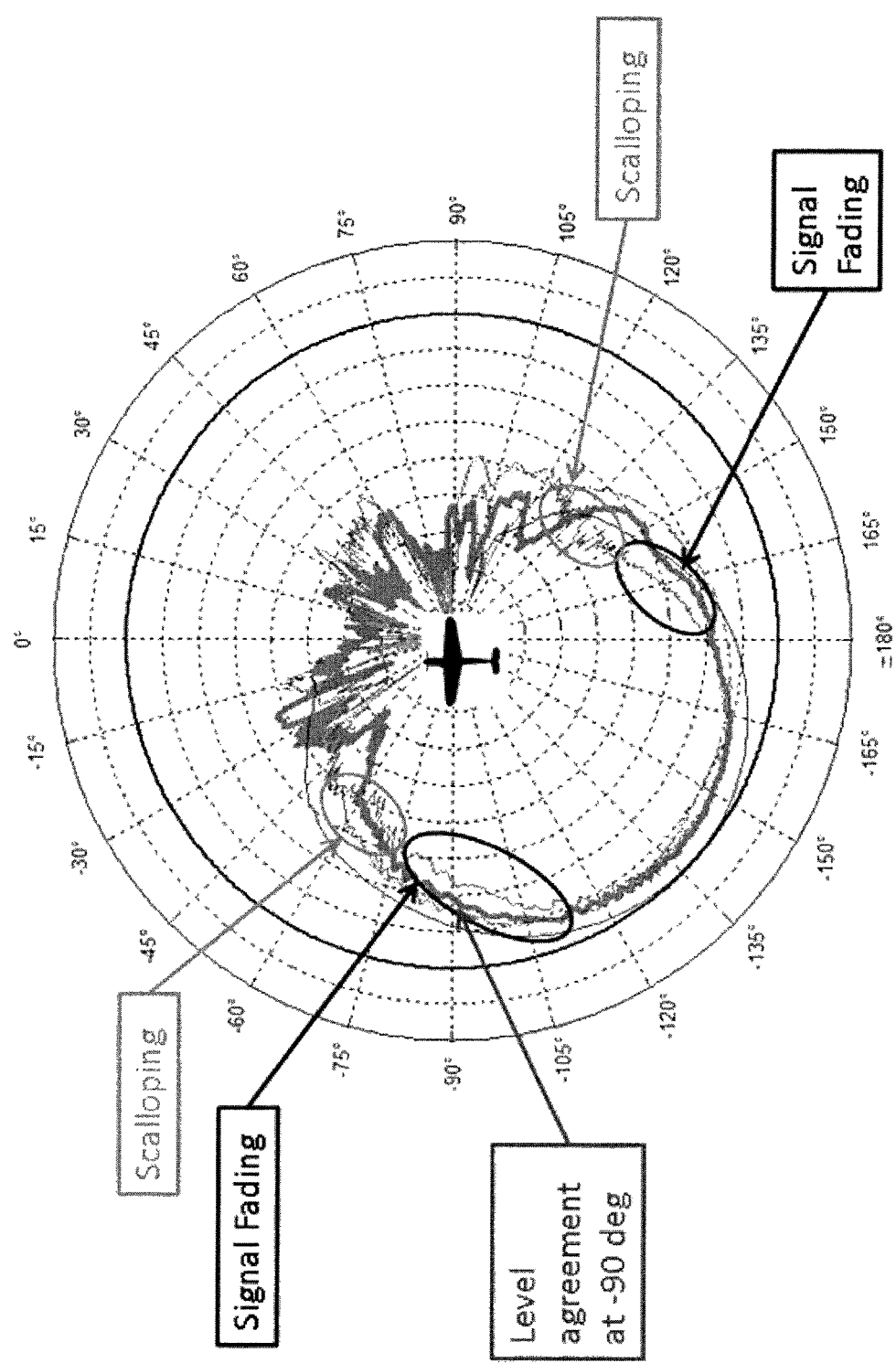

FIG. 6 depicts an example embodiment where raw data input 602 is evaluated by a selectivity process (automated or manual) to detect erroneous performance resulting in AoA inaccuracies. In the depicted example embodiment, the raw data 602 illustrates a signal ripple error 610, a signal fading error 620, level error agreement 630 and a scalloping error 640. In exemplary embodiments, selectivity may be used to generate a golden set of antenna patterns from the raw data 602, e.g., by eliminating outliers from consideration. In example embodiments, a training algorithm or weighting function may facilitate the selectivity process. In some embodiments, evaluation of an antenna pattern may be done in a segmented manner, e.g., based on a plurality of bins of ranges of azimuth angles relative to a boresight angle. Thus, each bin may be evaluated for errors such as noted with respect to FIG. 6. In example embodiments, scalloping error may be evaluated based on standard deviation within a given bin. In further example embodiments, level error agreement may be evaluated by comparing theoretical gain for an adjacent quadrant. As illustrated the raw data 602 may also be evaluated with or without antenna installation (602 vs. 604). FIG. 7 illustrates an example embodiment wherein raw data input is evaluated by a selectivity process (automated or manual) to detect erroneous performance resulting in AoA inaccuracies. In general, the selectivity process may evaluate for erroneous performance for complete 360° coverage around the aircraft. As previously noted the selectivity process may aim to reduce or eliminate scalloping effects, e.g., since such effects are not representative of the correct performance of the sensors.

As depicted in FIG. 8, the selectivity process may, in some embodiments, evaluate antenna gain, beam width, and beam squint for correct performance based on predictions (such as known antenna performance without aircraft perturbations). For example, in some embodiments, a specific antenna cannot have more gain than a maximum allowable antenna effective aperture size.

As depicted in FIG. 9, in example embodiments, the selectivity process may detect/evaluate two different patterns levels. Thus, for example, the selectivity process may enable selection of patterns yielding most appropriate crossovers between quadrants, e.g., based on symmetry between left and right quadrants. In some embodiments, symmetry between quadrants may be defined based on closest possible gain at one or more angular positions (for example at −90), Outliers (e.g., non-symmetrical pairs) may be rejected. Thus, as depicted in FIG. 9, a pattern for the forward right sensor quadrant may be selected (red) as optimal over a pattern in the forward left quadrant (blue). The forward left quadrant pattern may then be replaced with a mirrored pattern of the forward right sensor pattern. Once selected the pattern can then be further evaluated, e.g., to reduce ripple, remove scalloping effects, correct gain, check versus family performance variance, or add performance characteristics of other system components (such as cables, radomes and microcircuit switching).

Figure 10:
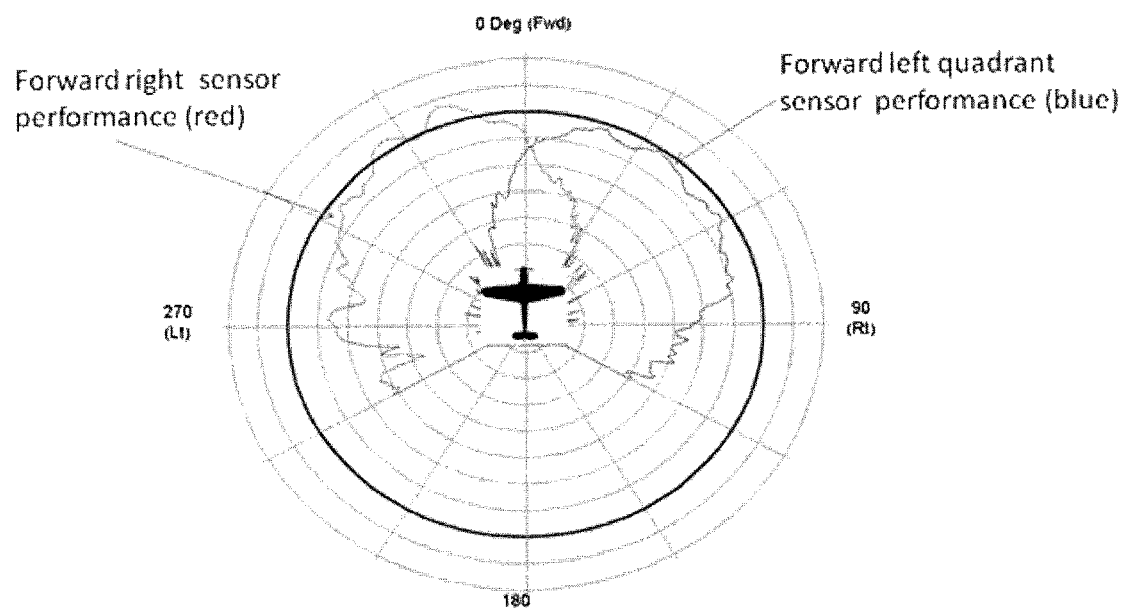

With reference now to FIG. 10, in example embodiments, selectivity may gather all available performance data inputs (radomes, antennas, cables, RF switches, receiver, including temperatures effects) and analyze (in auto mode or manually) all performances to eliminate or reduce system degradation (for example, with respect to AoA performance detection and location accuracy improvement). One output of the selectivity process (as described in the examples above) may include what can be referred to as the "Golden Patterns." These patterns are not necessarily antenna patterns in isolation. Rather these patterns produced as selectivity output can include RF receiver sensitivity detection optimization, temperature effects upon antenna/radome performance, etc. FIG. 10 depicts how the system impact, e.g., of cable transmission microcircuits, may be evaluated with respect to the antenna pattern variance and family performance.

Figure 11:
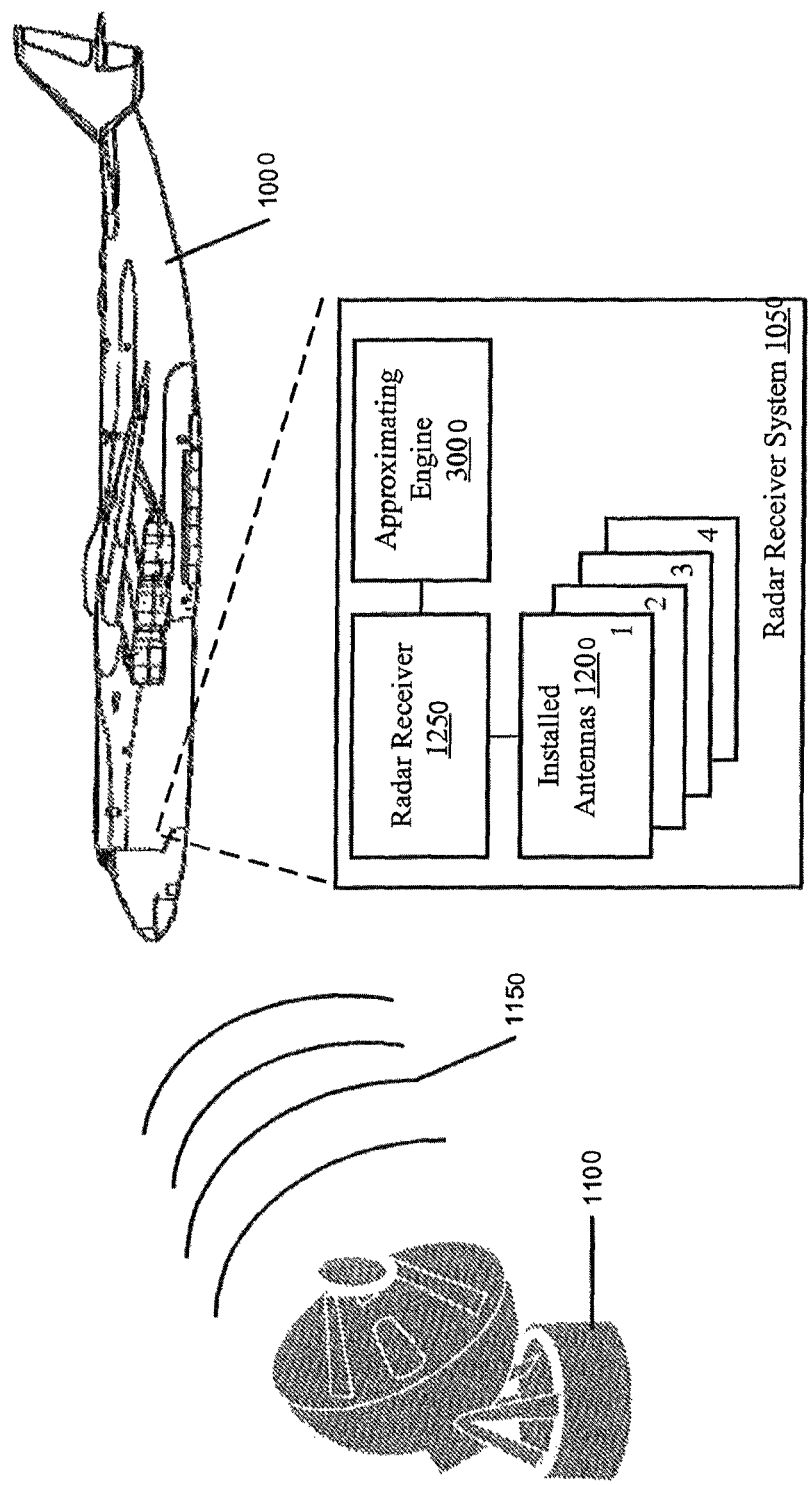
FIG. 11 is a block diagram of an example radar receiver system, according to the present disclosure.

FIG. 11 shows an example aircraft 1000 with a radar receiver system 105 for determining a location of an emitter 1100 from an angle of arrival of a radar signal 1150 sent from the emitter 1100. The radar receiver system 1050 includes antennas 1200 (typically four) communicatively coupled to a radar receiver 1250 to receive and process (e.g., detect) the radar signal 1150. How accurate the radar receiver system 1050 determines the location of the emitter 1100 depends on how well the radiation patterns of the installed antennas 1200 (or "radar receiver antenna patterns") are characterized. The radar receiver system 1050 may also include an approximating engine 3000 communicatively coupled to the radar receiver 1250. The approximating engine 3000 may in example embodiments generate an approximation or fit of the radiation pattern called an "optimized monotonic fit." In turn, the radar receiver system 1050 may calculate the angle of arrival of the radar signal and determines the location of the emitter, either in whole or in part, based on the optimized monotonic fit. In some embodiments, the approximation engine 3000 may be configured to implement a selectivity process and/or a compression algorithm as disclosed herein.

Although these teachings have been described with respect to various embodiments, it should be realized these teachings are also capable of a wide variety of further embodiments.

The invention claimed is:

1. A method for generating a look-up table for determining an angle of arrival (AoA) of a radar signal received from an emitter, the method comprising:
   a. for each of a plurality of antenna installation positions, selecting an installation-representative antenna pattern from an indexed plurality of data sets of antenna patterns associated with the antenna installation position, wherein the selected installation-representative antenna patterns are a most representative data set as scored against a predetermined set of weighted criteria; and
   b. calculating and recording in the look-up table differences between the selected installation-representative patterns for each set of adjacent antenna installation positions of the plurality of antenna installation positions,
   wherein the indexed plurality of data sets of antenna patterns includes a plurality of measured family-representative installed antenna patterns,
   wherein the measured family-representative installed antenna patterns are calculated by normalizing a set of measured installed antenna patterns to fit an average antenna chamber pattern for a family of measured chamber antenna patterns,
   wherein the indexed plurality of data sets further includes mirrored antenna patterns of the measured family-representative installed antenna patterns for other antenna installation positions, mirrored with respect to a mounting platform, and
   wherein, for each antenna installation position:
      each indexed antenna pattern, comprising an original and mirrored family average chamber pattern and measured family-representative installed antenna pattern set, is graphically superimposed; and
      the measured chamber patterns are adjusted such that a chamber mechanical boresight angle matches an installed mechanical boresight angle.

2. The method of claim 1, wherein the selected installation-representative antenna patterns are stored in a selectivity table.

3. The method of claim 1, wherein mirrored antenna patterns are mirrored front to back.

4. The method of claim 1, wherein mirrored antenna patterns are mirrored side to side.

5. The method of claim 1, wherein the indexed plurality of data sets further includes mirrored antenna patterns of the measured family-representative installed antenna patterns, mirrored with respect to the antenna.

6. The method of claim 1, wherein the plurality of data sets of antenna patterns are evaluated with respect to each of a plurality of angle bins around a boresight.

7. The method of claim 1, wherein selecting the installation-representative antenna pattern from the indexed plurality of data sets includes scoring each indexed data set against the predetermined set of weighted criteria and choosing a data set having the greatest possible score.

8. The method of claim 1, wherein a training set of preselected antenna patterns is utilized to facilitate determining relative weighting factors for the predetermined set of weighted criteria.

9. The method of claim 1, wherein a machine learning approach is applied to determine a scoring algorithm as a function of the predetermined set of weighted criteria.

10. The method of claim 1, wherein the differences between selected installation-representative patterns for each set of adjacent installation positions is indexed by true azimuth angle.

11. The method of claim 1, wherein a ratio of antenna pattern gains is calculated for each set of adjacent installation positions based on the selected installation-representative antenna patterns for those positions.

12. The method of claim 11, wherein the ratio of antenna pattern gains is expressed as a difference in decibel units.

13. The method of claim 11, wherein the calculation of the ratio of antenna pattern gains uses an optimized monotonic process.

14. The method of claim 13, wherein the ratio of antenna pattern gains is calculated based on an absolute value of the difference between optimized monotonic fits for the selected installation-representative antenna patterns.

15. The method of claim 1, wherein the look-up table relating pattern difference data with respect to antenna installation position is utilized to calculate the AoA of a radar signal.

16. The method of claim 11, further comprising compressing the data in the look-up table utilizing a compression algorithm which (i) identifies changes in the ratio of antenna pattern gains with respect to adjacent pairs of antenna installation positions in the look-up table and (ii) discards any antenna installation position that does not meet a threshold with respect to the changes in the ratio of antenna pattern gains.

17. The method of claim 16, wherein at least a portion of the compressed data is represented linearly.

18. The method of claim 16, wherein at least a portion of the compressed data is represented by a piecewise function calculated based in part on points of inflection where the ratio of antenna pattern gains changes sign.

* * * * *